Dec. 1, 1936.  F. E. LUEBKERT  2,062,670
BRAKE APPARATUS
Filed Sept. 5, 1935  3 Sheets-Sheet 1

INVENTOR
Fred E. Luebkert
BY
Ashley & Ashley
ATTORNEYS

Dec. 1, 1936.  F. E. LUEBKERT  2,062,670
BRAKE APPARATUS
Filed Sept. 5, 1935   3 Sheets-Sheet 2
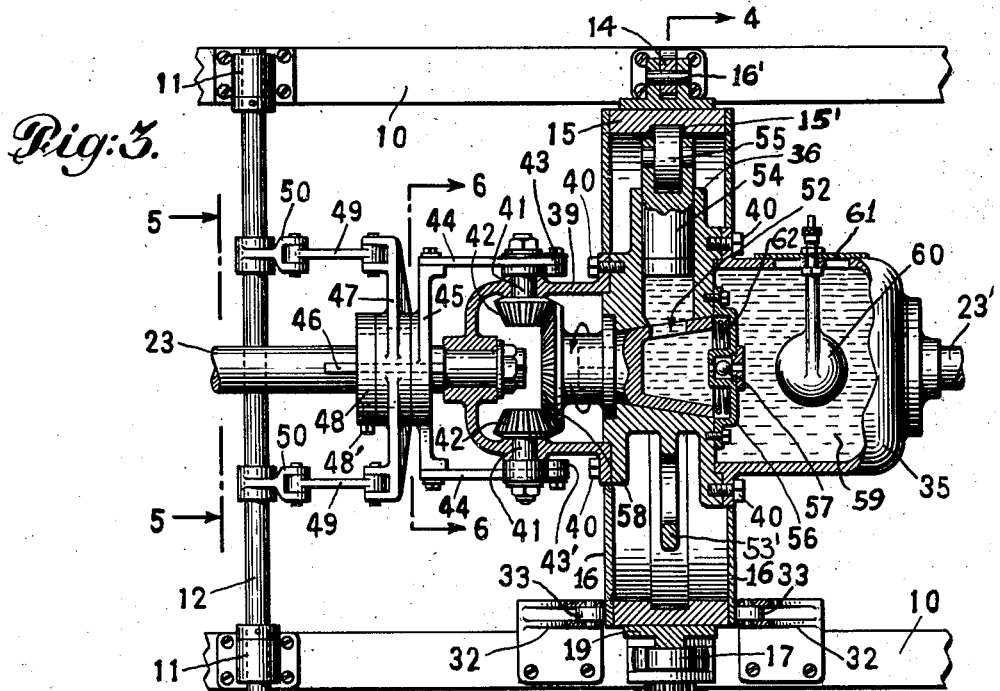

Dec. 1, 1936.    F. E. LUEBKERT    2,062,670
BRAKE APPARATUS
Filed Sept. 5, 1935    3 Sheets-Sheet 3

INVENTOR
Fred E. Luebkert
BY
Ashley & Ashley
ATTORNEYS.

Patented Dec. 1, 1936

2,062,670

UNITED STATES PATENT OFFICE 2,062,670

BRAKE APPARATUS

Fred E. Luebkert, Brooklyn, N. Y., assignor of one-half to Herman L. Greve, Hollis, N. Y.

Application September 5, 1935, Serial No. 39,218

9 Claims. (Cl. 188—91)

My invention relates to brakes for use with automobiles and other moving machines.

The object of my invention is to provide a new brake apparatus of the hydraulic type that will be effective for use with automobiles, street cars, elevators, etc. which are normally driven by a power plant, and to use the momentum of the vehicle to cause the brake to operate.

In operating the present brake a fluid is used which is pumped from one cylinder to another thru a controlling valve which in the present case is manually operated to interrupt the flow of fluid from the cylinders and thereby set the brake.

I may use oil as the fluid agent, but I prefer to use a solution of water and glycerine.

Referring to the drawings which form a part of this specification:

Fig. 3 is a plan view, partly in section, showing the fluid reservoir, the valve and gears for operating the valve, etc.

Fig. 4 is a cross sectional view taken on line 4—4 of Figure 3.

Fig. 5 is a cross sectional view taken on line 5—5 of Figure 3.

Fig. 6 is a cross sectional view taken on line 6—6 of Figure 3.

Fig. 7 is a view of a piston carrying a shoe instead of a roller bearing.

Fig. 8 shows a side view of the race-casing or frame resting in its normal position.

Fig. 9 is a view of a portion of the cylinder casing, showing the controlling valve in section, together with a valve controlled outlet, hereinafter more fully described.

Fig. 10 is a side view of the cam by means of which the race-frame is lifted in the act of setting the brake.

Figure 1:
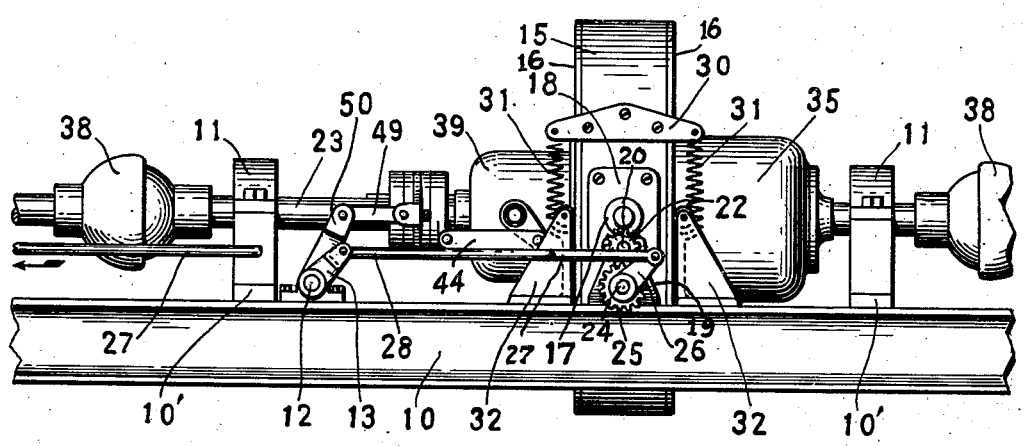
Fig. 1 is a side elevational view of my brake apparatus shown as mounted on a frame of a motor car.

10 indicates the main frame of a car having cross portions 10'—10' respectively.

11—11 respectively indicate bearings mounted on the side of said frame portions, and 12 a countershaft on one end of which is mounted a lever 13 in fixed relation therewith.

14 indicates a bracket fixed on the said frame, and 15 a race-casing in which is formed an annular race 15'.

The race casing or frame 15 is hinged to the bracket 14 at 16', and carries on its opposite side a roller 17, which in turn is carried by a bracket 18 fixed on the casing.

Side plates 16 are carried by the casing and serve to strengthen it, and also to hold a lubricant for the brake shoes.

19 indicates a bracket fixed on the frame and formed in said bracket is a bearing in which is supported a stud-shaft 20 and fixed on said stud-shaft is a cam 21 and a gear-wheel 22. The cam is preferably made with a cylindrical surface concentric with the stud-shaft for a portion of its circumference and terminates in a flat plane surface on one side on which the roller 17 normally rests, and in which position the race 15' is concentric with the axis of the main driving shaft 23.

The bracket 19 also carries a short shaft 24 in fixed relation therewith, and a gear-wheel 25 of greater diameter than wheel 22 which is rotated on said shaft by means of a lever 26 formed integral with the hub 25' of the gear-wheel 25.

The lever 26 is manually operated by a rod 27 hinged on one side thereof, and a rod 28 is hinged to the opposite side of the lever and extends to a lever 13 mounted on one end of the cross shaft 12 in fixed relation therewith.

A bracket 30 is fixed on the race casing and carries springs 31 which are connected at their lower ends with the brackets 32 mounted on the frame 10, and serve to hold the race-casing firmly in position.

The brackets 32 each carries a roller 33 which bears against the respective side plates of the race-casing 15 to support the said casing.

23' indicates a shaft which with shaft 23 supports the reservoir casing 35, cylinder casing 36 and pistons 54 together with the valve and gearing to operate the valve.

38—38 respectively indicate the usual couplings of the universal type.

Carried on one end of the shaft 23 which is normally the driving shaft of the car, it being connected to the motor thru the differential gears in the usual manner, is a casing 39 which in turn is connected to the cylinder casing 36 by bolts 40, and the casing 35 is connected to the casing 36 in the same way.

Therefore the rotation of the shaft 23 rotates all of said casings and drives shaft 23' which in turn drives the rear wheels of the car in the usual manner.

The casing 39 is cylindrical in form and is provided with two oppositely disposed bearings in which are seated short shafts 41—41 respectively, having gear-wheels 42—42 respectively formed integral therewith and positioned within the casing as illustrated.

The outer ends of the shafts 41 carry levers 43 and 43' respectively, the lever 43 extending upwardly and the lever 43' downwardly relative to the axial line thru the shafts 41, and to the free end of each lever is attached a bar 44 in hinged relation, which extends to a sliding yoke 45, the hub 45' of which fits in sliding relation on the shaft 23 and is rotated in unison with the shaft 23 by means of a spline 46 fitted therein.

The periphery of the hub 45' is formed cylindrical and mounted thereon is a cross-piece 47 held by a ring 48 secured to the end of the hub 45' by a pin 48', or other suitable means.

Connected in pivotal relation with said cross-piece are bars 49, the opposite ends of which are connected with upwardly extending levers 50 fixed on the counter-shaft 12.

51 indicates a plug valve having three ports 52 respectively, located in the centre of the cylinder casing, said ports being normally in full open communication with the cylinders 53 formed in the casing.

Pistons 54 are fitted in the cylinders and each of same carries a roller or other suitable bearing 55 which fits in the race 15'.

56 indicates a cap for the large end of the plug valve, and is used to prevent leakage of fluid back to the reservoir.

57 indicates a check-valve opening inwardly to the interior of the valve 51.

58 indicates a gear-wheel carried on the small end of the plug valve within the casing 39, and is driven by the gear wheels 42.

59 indicates oil or other suitable fluid, and 60 indicates an expansible elastic bag carried by a plate 61 fitted to the casing of the reservoir; the bag being inflated with air under pressure.

The expansion of the bag serves to force the fluid thru the check-valve and supply any loss of same due to leakage from the circulating system.

To insure the valve 51 seating properly at all times, a spring 62 is placed between the larger end of the valve and the cap 56.

Instead of a ball or roller bearing 55, a shoe 55' may be used provided the race is properly lubricated.

The side plates 16 carried by the race-frame serve to hold the lubricant in the annular trough thus formed.

A web-like brace 53' is cast integral with the cylinder-casing to strengthen the same, illustrated in Figure 3.

I prefer to use leather cups 54' instead of piston rings.

A single gear wheel 42 in mesh with gear-wheel 58 may be used to operate the valve, but this would require counter-weights to insure the rotation of the casing and parts in balance, as will be readily understood.

The construction as shown is such that all of the rotating parts are fairly well balanced.

The power plant may be located at either end of the braking apparatus and will function properly when rotated in either direction and when mounted on a car, the brake will operate properly, regardless of direction of travel.

*Operation*

Assuming the casing 35 and cylinders etc. are full of oil or other suitable fluid, and that the bag 60 is filled with air under pressure to cause it to expand; also assuming the power plant to be mounted on an automobile and driving the shaft 23, and that the race-casing is in its normal position, that is with the race positioned concentric with the shafts as illustrated in Figures 3 and 4:

Under these conditions the shaft 23 will drive the casings, and shaft 23' to transmit motion thru the differential gears of the car to the wheels thereof, and during this operation the pistons will remain at rest in their respective cylinders, but the roller bearings will be turning in the race.

To brake, or stop the car, the motor is disconnected from the drive shaft and thereafter the brake mechanism is rotated by power transmitted from the driving wheels of the car, the rotation being in the same direction.

Figure 2:
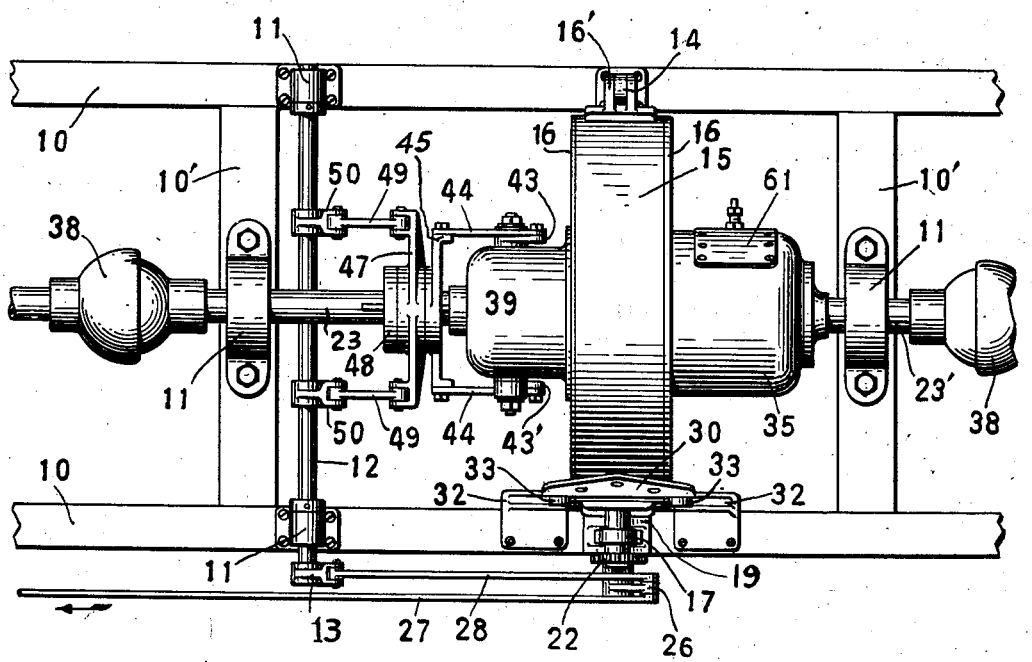
Fig. 2 is a plan view illustrating the valve control means.

The control rod 27 is then moved in the direction indicated by the arrow in Figures 1, 2 and 3, the first part of the movement causing the cam 22 to rotate almost instantly far enough to raise the race-casing so that the race is positioned eccentric to the longitudinal axis of the drive shaft, thus causing the pistons to reciprocate and pump a portion of the fluid from one cylinder thru the valve to another, thus beginning the loading action of the shaft 23' and starting the braking action. This requires very little power to lift the race-casing due to the ports being nearly wide open.

A further movement of the lever 27 (usually controlled by a foot pedal) causes a further rotation of the countershaft 12 to in turn draw the yoke 45 in the same direction.

The cross-piece 47 does not rotate but rides on the hub 45' of the yoke which is rotated by the shaft 23', and in turn by the shaft 23 to which it is splined.

When the yoke 45 is moved, motion is transmitted to the levers 43 and 43' thru the side bars 44, and the gear-wheels 42 are rotated and transmit motion to the gear-wheel 58, thus rotating the valve a distance proportional to the movement of the control rod 27.

As the valve closes, the area of the ports is decreased and causes an increased pressure on the pistons, thus loading the drive shaft 23'.

When the valve is completely closed, the fluid is trapped in the cylinders, the effect being to lock the pistons in a fixed position and cause a wedging action between the rollers and race and in consequence prevents further rotation of the shafts.

When the apparatus is at rest, any leakage of fluid from the cylinders is automatically replaced by the action of the expanding bag 60 which forces fluid from the reservoir thru the check-valve 57, thus keeping the cylinders filled.

It will be evident from its construction that the apparatus herein described may be used for brake control in hoisting engines, street cars, and other constructions where a load is to be controlled by brake mechanism.

Having thus described my invention I claim as new:

1. A brake apparatus of the character described comprising a main frame, a race-frame mounted thereon having a circular race formed therein, a shaft carried by the main frame concentric with said race, a rotatable casing having cylinders formed therein connected with said shaft, a valve having ports located adjacent the inner ends of said cylinders and normally in open communication therewith, pistons in said cylinders, elements carried by said pistons adapted to abut said race, fluid in said cylinders, means for moving said race to an eccentric position relative to said shaft, and means for operating said valve to vary the area of opening thru said ports.

2. The construction set forth in claim 1, together with: a casing for holding a reserve supply of fluid and means for forcing the fluid therefrom into operative relation with said pistons.

3. A brake apparatus of the character described comprising a main frame, a race-frame having a circular race formed therein, carried by said main frame, bearings mounted on said frame, a shaft supported in each of said bearings, a casing carried by said shafts, cylinders formed in said casing, pistons in said cylinders, elements carried by said pistons adapted to abut said race, fluid in said cylinders, means for moving said race to an eccentric position relative to said shafts, a valve having ports located adjacent the inner ends of said cylinders and normally in open communication therewith, and means for operating said valve to vary the openings therethru.

4. A brake apparatus of the character described comprising a cylinder-casing having a plurality of cylinders formed therein with their inner ends located at the middle thereof, a valve formed adjacent the inner ends of said cylinders, pistons in said cylinders, a frame, shafts mounted thereon in alignment with each other and carrying said cylinder-casing, a counter-shaft, levers mounted thereon, means connecting said levers with said valve in operative relation, and means for manually rotating said counter-shaft.

5. The construction set forth in claim 4, together with: a race-frame having a race formed therein, and bearing elements carried by said pistons adapted to abut said race.

6. A brake apparatus of the character described comprising a frame, a race-frame having a circular race formed therein, mounted on said frame, bearings carried by said frame, a shaft supported in each of said bearings, a cylinder-casing carried by said shafts the axis of which is concentric with said race, a valve in said cylinder-casing, cylinders formed in said cylinder-casing, pistons in said cylinders, elements carried by said pistons adapted to abut said race, fluid in said cylinders, means for moving said race to an eccentric position relative to said shafts and for supporting it in such position and means for moving said valve to open and close the same without changing the position of said race.

7. The construction set forth in claim 6, together with: and means carried by said frame for supporting the sides of the race frame to prevent lateral movement.

8. A brake apparatus of the character described comprising a frame, a race-frame thereon having a circular race, bearings carried by said frame, a shaft supported by each of said bearings, a cylinder-casing carried by said shafts the axis of which is concentric with said race; cylinders formed in said cylinder-casing, pistons in said cylinders, elements carried by said pistons adapted to abut said race, fluid in said cylinders, means for moving said race to an eccentric position relative to said shafts, a valve having ports located adjacent the inner ends of said cylinders and normally in open communication therewith, means for operating said valve comprising a casing mounted on the cylinder-casing, a gear-wheel carried by said casing, a gear-wheel mounted on one end of said valve in mesh with said first gear-wheel, and means for rotating said gears to operate said valve.

9. The construction set forth in claim 8, together with: a fluid filling said cylinders and an additional supply carried in normal open communication therewith.

FRED E. LUEBKERT.